United States Patent
Baksh et al.

(10) Patent No.: US 6,340,382 B1
(45) Date of Patent: Jan. 22, 2002

(54) PRESSURE SWING ADSORPTION PROCESS FOR THE PRODUCTION OF HYDROGEN

(76) Inventors: Mohamed Safdar Allie Baksh, 2635 Sweet Home Rd., Amherst, NY (US) 14228; Mark William Ackley, 96 Church St., East Aurora, NY (US) 14052

( * ) Notice: Subject to any disclaimer, the term of this patent is extended or adjusted under 35 U.S.C. 154(b) by 0 days.

(21) Appl. No.: 09/373,749

(22) Filed: Aug. 13, 1999

(51) Int. Cl.[7] .................. B01D 53/047; B01D 53/26
(52) U.S. Cl. ..................... 95/96; 95/117; 95/130; 95/139; 95/140; 95/143
(58) Field of Search ............... 95/96–98, 100–105, 95/117–119, 121, 130, 139, 140, 143, 902; 96/108, 130–132, 143, 144

(56) References Cited

U.S. PATENT DOCUMENTS

| | | | |
|---|---|---|---|
| 3,150,942 A | 9/1964 | Vasan | 55/31 |
| 3,313,091 A | 4/1967 | Berlin | 55/58 |
| 3,430,418 A | 3/1969 | Wagner | 55/25 |
| 3,564,816 A | 2/1971 | Batta | 55/26 |
| 3,720,042 A * | 3/1973 | Simonet | 95/130 X |
| 3,866,428 A * | 2/1975 | Simonet et al. | 95/121 X |
| 4,171,206 A | 10/1979 | Sircar | 55/26 |
| 4,477,264 A * | 10/1984 | Kratz et al. | 95/121 X |
| 4,481,018 A * | 11/1984 | Coe et al. | 95/130 |
| 4,859,217 A * | 8/1989 | Chao | 95/130 |
| 4,892,565 A * | 1/1990 | Schmidt et al. | 95/130 X |
| 4,957,514 A | 9/1990 | Golden et al. | 55/26 |
| 5,174,979 A * | 12/1992 | Chao et a. | 95/130 X |
| 5,294,247 A | 3/1994 | Scharpf et al. | 95/101 |
| 5,413,625 A * | 5/1995 | Chao et al. | 95/130 X |
| 5,454,857 A * | 10/1995 | Chao | 95/130 X |
| 5,464,467 A * | 11/1995 | Fitch et al. | 95/130 X |
| 5,505,764 A * | 4/1996 | Fuentes | 95/121 X |
| 5,529,610 A * | 6/1996 | Watson et al. | 95/130 X |
| 5,531,808 A * | 7/1996 | Ojo et al. | 95/139 X |
| 5,658,370 A * | 8/1997 | Vigor et al. | 95/130 X |
| 5,674,311 A * | 10/1997 | Notaro et al. | 95/130 X |
| 5,753,010 A | 5/1998 | Sircar et al. | 95/45 |
| 5,810,909 A * | 9/1998 | Notaro et al. | 95/130 X |
| 5,885,331 A * | 3/1999 | Reiss et al. | 95/117 X |
| 5,912,422 A * | 6/1999 | Bomard et al. | 95/130 X |
| 5,922,107 A * | 7/1999 | Labasque et al. | 95/130 X |
| 5,993,516 A * | 11/1999 | Morris et al. | 95/130 X |
| 6,007,606 A * | 12/1999 | Baksh et al. | 95/117 X |

FOREIGN PATENT DOCUMENTS

WO      WO97/45363 A1      4/1997

* cited by examiner

Primary Examiner—Robert H. Spitzer
(74) Attorney, Agent, or Firm—Robert J. Follett (57) ABSTRACT

This invention provides a pressure swing adsorption process for purifying a synthesis gas stream containing from 60 to 90 mole % hydrogen and impurities such as $CO_2$, $CH_4$, $N_2$, and CO. The PSA process of the invention further provides a method of adsorbing substantially all of the nitrogen and other contaminants from the feed gas stream; wherein the feed stream is passed at superatmospheric pressure through a plurality of adsorbent beds and each adsorbent bed contains at least a CaX, LiA, LiX or calcium containing mixed cation zeolite having a $SiO_2/Al_2O_3$ mole ratio of 2.0–2.5. Such process involves sequentially pressurizing, depressurizing, purging and repressurizing the adsorbent beds with product hydrogen, and recovering product hydrogen in purities of 99.9% or greater from the beds.

12 Claims, 11 Drawing Sheets

Schematic Drawing of a PSA Adsorption Bed of the Present Invention.

PRESSURE SWING ADSORPTION PROCESS FOR THE PRODUCTION OF HYDROGEN

FIELD OF THE INVENTION

This invention relates to a pressure swing adsorption (PSA) process for purifying impure gas streams containing more than 50 mole % hydrogen, and more particularly to such a process for the production of high purity hydrogen from various hydrogen-containing feed mixtures such as synthesis gas. The improved process provides higher hydrogen recovery and lower adsorbent inventory as compared with previously known PSA processes for hydrogen production.

BACKGROUND OF THE INVENTION

The need for high purity (>99.9%) hydrogen is growing in the chemical process industries, e.g. in steel annealing, silicon manufacturing, hydrogenation of fats and oils, glass making, hydrocracking, methanol production, the production of oxo alcohols and isomerization processes. This growing demand requires the development of highly efficient separation processes for $H_2$ production from various feed mixtures. In order to obtain highly efficient PSA separation processes, both the capital and operating costs of the PSA system must be reduced.

One way of reducing PSA system cost is to decrease the adsorbent inventory and number of beds in the PSA process. In addition, further improvements may be possible using advanced cycles and adsorbents in the PSA process. However, $H_2$ feed gas contains several contaminants, e.g. $CO_2$ (20% to 25%) and minor amounts of $H_2O$ (<0.5%), $CH_4$ (<3%), CO (<1%) and $N_2$ (<1%). Such a variety of adsorbates at widely varying compositions, combined with the high purity (>99.9%) requirement for $H_2$, presents a significant challenge to efficient selection, configuration and amount of adsorbents in each layer of the bed to achieve an efficient $H_2$-PSA process.

Figure 1:
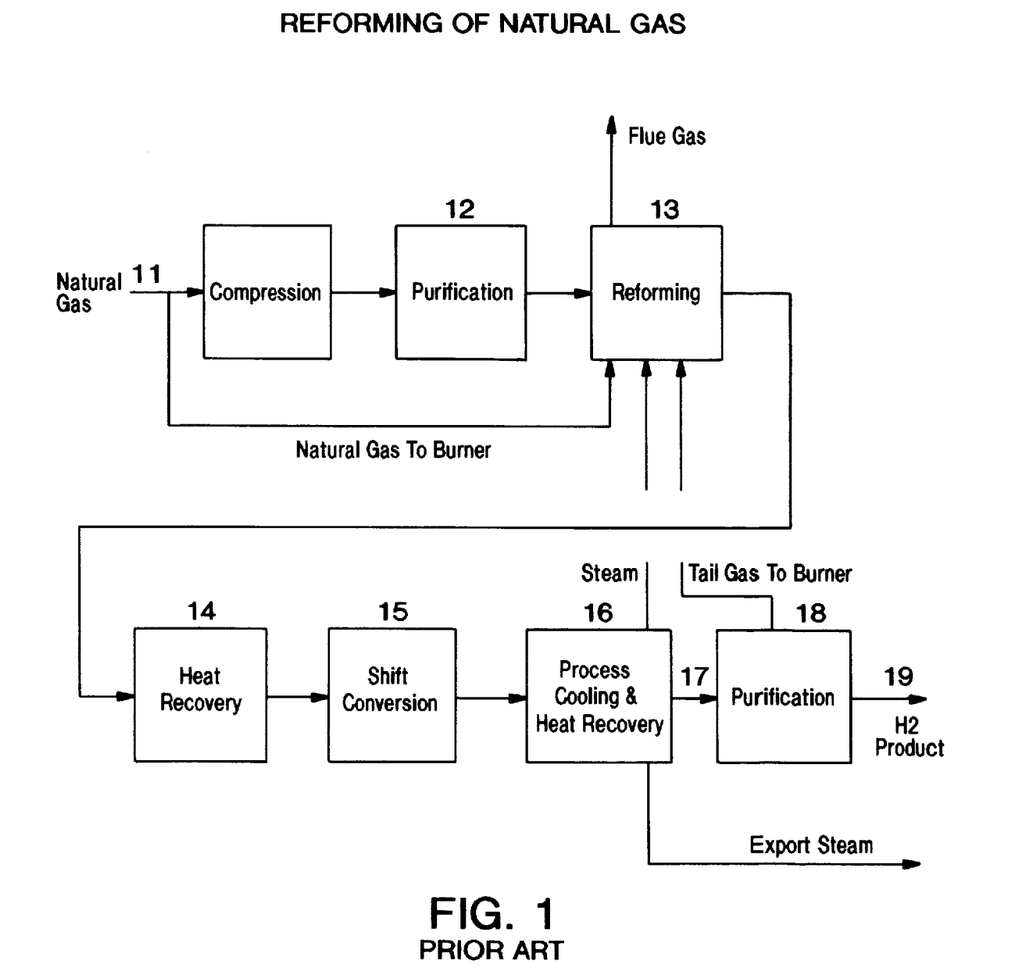
FIG. 1 is a schematic of the prior art technique for the production of hydrogen by the steam reforming of natural gas.

There are a variety of known processes for producing hydrogen. For example, FIG. 1 of the accompanying drawings shows the steam reforming of natural gas or naphtha wherein a feedstock, e.g. a natural gas stream 11, is compressed and fed to a purification unit 12 to remove sulfur compounds. The desulfurized feed is then mixed with superheated steam and fed to a reformer 13 to produce primarily $H_2$ and CO. The effluent stream from the reformer is sent to a heat recovery unit 14, then to a shift converter 15 to obtain additional $H_2$. The effluent from the shift converter is cooled and recovered in unit 16. The effluent, synthesis gas stream 17, having on a dry basis a composition of about 74.03% $H_2$, 22.54% $CO_2$, 0.36% CO, 2.16% $CH_4$, and 0.91% $N_2$ is then routed to a PSA purification system 18 to produce a high purity hydrogen product stream 19.

Representative prior art PSA processes for hydrogen purification include the following: (1) Wagner, U.S. Pat. No. 3,430,418, (2) Batta, U.S. Pat. No. 3,564,816, (3) Sircar et al., U.S. Pat. No. 4,077,779, (4) Fuderer et al., U.S. Pat. No. 4,553,981, (5) Fong et al, U.S. Pat. No. 5,152,975 and (6) Kapoor et al., U.S. Pat. No. 5,538,706.

The adsorbers in hydrogen PSA processes have been conceptually divided into multiple zones, depending upon the particular contaminants to be removed in the successive zones. For example, in Wagner (U.S. Pat. No. 3,430,418) a combination of two types of adsorbents is used, i.e. activated carbon for the removal of $H_2O$ and $CO_2$, and calcium zeolite A for removal of CO and $CH_4$ (see Example 1). The Wagner patent describes an eight-step PSA cycle for hydrogen purification. At least four beds are used in the process; following the bed-to-bed equalization step, each bed undergoes a co-current depressurization step prior to countercurrent blowdown to recover void space gas for purging of another bed.

Batta (U.S. Pat. No. 3,564,816) describes a twelve-step PSA cycle using at least four adsorbent beds and two pressure equalization stages for separating hydrogen-containing gas mixtures contaminated with $H_2O$, $CO_2$, $CH_4$ and CO produced in the steam reforming of natural gas. In the Batta process, a co-current depressurization step follows the first bed-to-bed equalization step to recover void space gas for purging of another bed. A second bed-to-bed equalization step is used prior to the countercurrent blowdown step in the PSA cycle.

Sircar, (U.S. Pat. No. 4,171,206), discloses a PSA process in which a crude hydrogen stream (such as the gaseous effluent from a shift converter of a hydrocarbon reforming plant) flows through a first bed of activated carbon (effective for the removal of $CO_2$), and then through a second bed of 5A zeolite (effective for the removal of dilute impurities such as $CH_4$ and/or CO) to produce high purity (>99.9%) hydrogen.

Golden et al, (U.S. Pat. No. 4,957,514), discloses the purification of hydrogen using a barium-exchanged Type X zeolite to remove CO, $CH_4$ and $N_2$ contaminants. According to Golden, the preferred BaX zeolite is one in which 60 to 100% of the sodium cations of a NaX zeolite have been replaced by barium cations. Golden compares the adsorbent requirements using BaX (96% Ba, 4% Na), CaX (98% Ca, 2% Na), Ca/SrX (50% Ca, 50% Sr), and commercial 5A zeolites in hydrogen purification processes. For a given feed flow rate and $H_2$ purity, the quantity of zeolite required in the hydrogen purification process is lowest when BaX is used. Also, Golden ranks the adsorbents in the order BaX>Ba/SrX>5A>SrX>Ca/SrX>CaX for CO or $CH_4$ adsorption. In particular, CaX is ranked the lowest with respect to the removal of CO and $CH_4$ impurities.

Scharpf et al, (U.S. Pat. No. 5,294,247), discloses a vacuum PSA process for recovering hydrogen from dilute refinery off gases, preferably containing less than 60% hydrogen. The patent discloses the use of six adsorbent beds, each of which contains a layer of activated carbon, a layer of 13X zeolite, a layer of 5A zeolite and a layer of CaA zeolite or calcium exchanged X zeolite. This four-layer arrangement is described as useful for the removal of large feed concentrations (>1%) of CO and $CO_2$.

More recently, Bomard et al in International Patent Application WO97/45363, disclosed a method for separating hydrogen from a gas mixture that contains CO and other impurities such as $CO_2$ and hydrocarbons. In the Bomard application, the feed mixture is passed into a first selective adsorbent (e.g., activated carbon) to remove $CO_2$ and hydrocarbons. It is then contacted by a second adsorbent, a faujasite-type zeolite with at least 80% lithium exchange, to remove primarily CO impurity and to produce high purity hydrogen. In addition, a third adsorbent (5A zeolite) may be placed between the first and second adsorbents to remove nitrogen if $N_2$ is also present in the feed mixture.

It is also known to utilize PSA processes for the selective adsorption of $N_2$ from air to obtain $O_2$-enriched gases. Berlin, (U.S. Pat. No. 3,313,091), describes the use of strontium-substituted type X zeolites in such a process and stipulates that $Ca^{2+}$, $Sr^{2+}$, and $Ag^+$ are the preferred exchanged cations with $Sr^{2+}$ being most desirable. In the case of Type A zeolite, $Ca^{2+}$, $Mg^{2+}$ and $Ag^+$ are preferred.

Coe et al, (U.S. Pat. No. 4,481,018), also discloses PSA air separation processes involving $N_2$ and $O_2$ separations using calcium-exchanged forms of zeolite X, and showed enhanced PSA process performance with increasing calcium content. However, Chao (U.S. Pat. Nos. 5,698,013 and 5,454,857) discloses for calcium-exchanged forms of zeolite X a peak performance in air separation below maximum calcium content. In particular, the peak performance occurs when the degree of calcium exchange is in the range of 60 to 89 equivalent percent, and the $SiO_2/AlO_2O_3$ molar ratio is in the range of 2.0 to 2.4.

The operating conditions used in $H_2$ PSA processes are distinct from those used in PSA processes for $O_2$ production from air. The adsorption pressure is typically less than 2.5 bars in VPSA air separation, while the adsorption pressure is 5 to 20 bars in $H_2$ PSA.

The amount of $N_2$ in the feed streams of these two processes is significantly different, e.g. the $N_2$ fraction in air is about 78 mole %; whereas, in hydrogen purification, the proportion of $N_2$ in the feed stream is typically less than 1–3 mole %. Consequently, the $N_2$-selective adsorbents disclosed in the aforementioned references for air separation must perform in different $N_2$ partial pressure regions of the isotherm than those required for the function of purification in $H_2$ PSA processes. Furthermore, the $N_2$ differential loadings in $O_2$ VPSA and $H_2$ PSA processes are quite different for a given $N_2$-selective adsorbent (e.g., zeolite). Additional complications in the design of $H_2$PSA processes result from the competitive adsorption and diffusion rates of each adsorbate in the mixture. In selecting improved adsorbents and designing $H_2$ PSA processes, due consideration must be given to all of the foregoing issues.

The adsorbent typically used heretofore in $H_2$ PSA processes is 5A zeolite, obtained by base exchange of Ca (about 75%) with the sodium ion present in 4A zeolite.

It is among the objects of the present invention to provide an improved PSA process for the production of hydrogen from an impure gas stream containing more than 50 mole % hydrogen, such improvements realized as increased hydrogen recovery, reduced adsorbent and lower capital and operating costs. Other objects and advantages of the invention will be apparent from the following description taken in connection with the accompanying drawing.

SUMMARY OF THE INVENTION

In accordance with the present invention, an improved PSA process is provided for purifying a gas stream containing more than about 50 mole % hydrogen, which comprises adsorbing substantially all of the nitrogen in such stream by passing it at superatmospheric pressure through an adsorbent bed containing CaX, LiA or LiX-type zeolite adsorbent having $SiO_2/Al_2O_3$ mole ratio within the range of 2.0–2.5, and recovering purified hydrogen as product from the adsorbent bed. By providing additional adsorbent layers to remove other impurities such as $H_2O$, $CO_2$, $CH_4$ and CO upstream of the CaX, LiA or LiX zeolite adsorbent, a high purity ($\geq 99.9\%$) hydrogen product is recovered.

In accordance with a further feature of the invention, substantially all of the $CO_2$ is first removed, i.e. leaving less than about 0.15 mole %, preferably less than about 0.10 mole % $CO_2$ for subsequent passage into the zeolite layer where this residual $CO_2$ is removed along with the $N_2$. Configuring the adsorbent bed according to this contaminant removal strategy increases $H_2$ recovery and reduces the quantity of zeolite required for $N_2$ removal compared to prior art PSA processes for $H_2$ production.

The preferred adsorbents utilized in the process of the present invention are CaX zeolites, most desirably CaX (2.0), a zeolite of the faujasite type exchanged at least 90% with calcium and having a $SiO_2/Al_2O_3$ molar ratio of 2.0. CaX (2.0) allows the processing of more feed gas per unit weight of adsorbent at a given P/F (purge to feed) ratio than other $N_2$-selective adsorbents. Accordingly, by using CaX (2.0) the amount of the adsorbent required for removing N2 may be significantly reduced, i.e. reducing the bed size factor (BSF). Moreover, this reduction in bed size factor results in lower $H_2$ losses during regeneration of the adsorbent bed. This in turn leads to higher hydrogen recovery than may be obtained with other $N_2$-selective adsorbents.

DETAILED DESCRIPTION OF THE INVENTION

As indicated hereinabove, the PSA process of the present invention provides improved recovery of high purity (greater than 99.9%) hydrogen from gas streams containing more than about 50 mole % $H_2$, and preferably from about 60 to 90 mole hydrogen. The process is particularly applicable to the purification of synthesis gas produced in feed streams recovered in reforming processes such as outlined in FIG. 1 of the drawing. Such streams may contain from 60 to 90 mole % hydrogen with impurities that include $CO_2$, $H_2O$, $CH_4$, $N_2$ and CO.

Desirably, the purification is affected by passing the stream at superatmospheric pressure through a plurality of adsorbent beds each of which contains at least one adsorbent layer containing CaX, LiA or LiX zeolite having a $SiO_2/Al_2O_3$ ratio within the range of 2.0–2.5 for adsorbing substantially all of the $N_2$ from the stream. The process includes the steps of sequentially pressurizing, depressurizing, purging and repressurizing the adsorbent beds with product hydrogen to obtain the desired hydrogen product in purities of 99.9% or greater as unadsorbed effluent from the beds.

As indicated herein above, the preferred CaX zeolite adsorbent utilized in the practice of this invention is CaX (2.0), an adsorbent which has been found to provide superior nitrogen adsorption as compared with other $N_2$-selective adsorbents. Other useful Ca-exchanged zeolites may be prepared from naturally occurring crystalline zeolite molecular sieves such as chabazite, erionite, clinoptilolite and faujasite. Alternatively, the CaX zeolites useful herein include mixed cation (e.g. $Ca^{2+}$ and $Na^+$) zeolites such as VSA-6 developed by UOP of Des Plaines, Ill. with 74% $Ca^{2+}$ and a $SiO_2/Al_2O_3$ ratio of 2.3. In general, by "mixed cations" we mean an adsorbent containing at least two different cations. Such adsorbents would further include for example LiSrX, CaLiX, CaNaX, etc.

LiA and LiX zeolites having $SiO_2/Al_2O_3$ ratios within the range of 2.0–2.5 are useful in the processes described above. Other adsorbents displaying improved performance include mixed lithium/alkaline earth metal Type A and Type X zeolites having $SiO_2/Al_2O_3$ molar ratios in the range of 2.0–2.5 such as CaLiX (2.3), having calcium contents of 15–30% (see Chao et al, (U.S. Pat. Nos. 5,413,625; 5,174,979; 5,698,013; 5,454,857 and 4,859,217). The zeolite disclosures of the foregoing patents are incorporated by reference herein.

Figure 2:
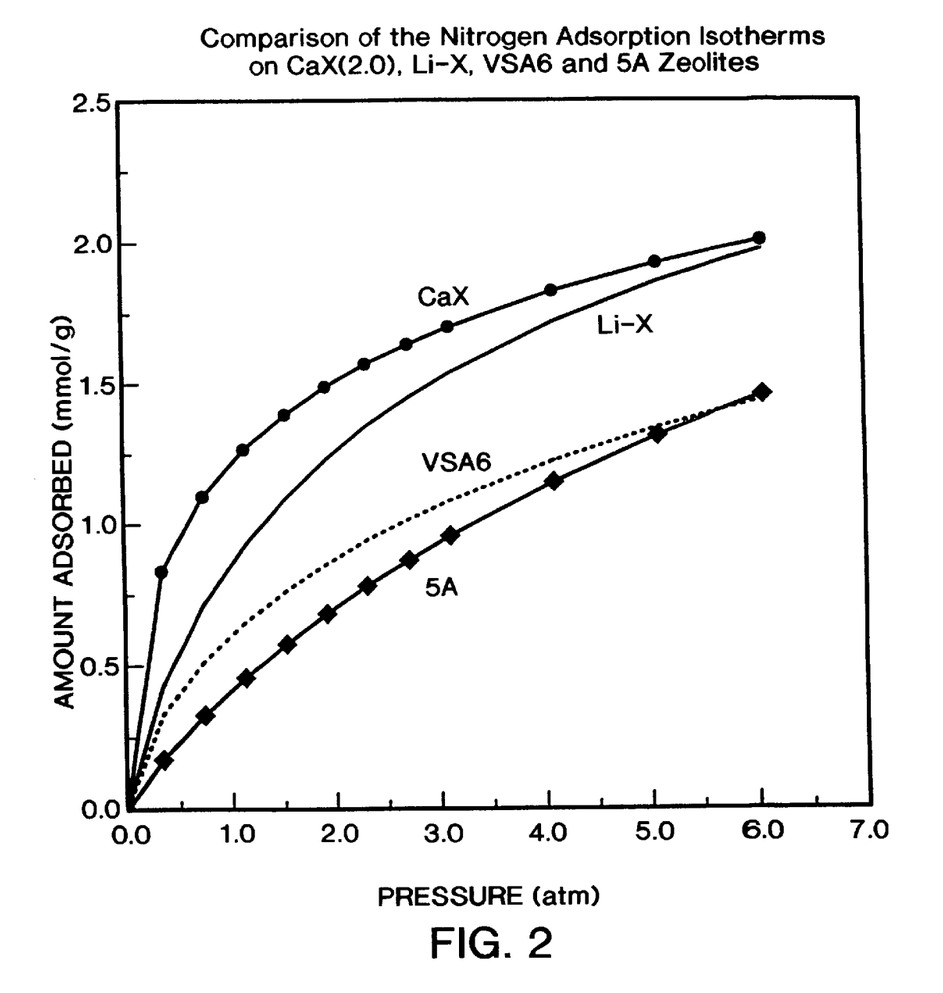
FIG. 2 is a comparison of the $N_2$ adsorption isotherms of CaX (2.0) and other $N_2$-selective zeolite adsorbents, at 300° K.
Figure 3:
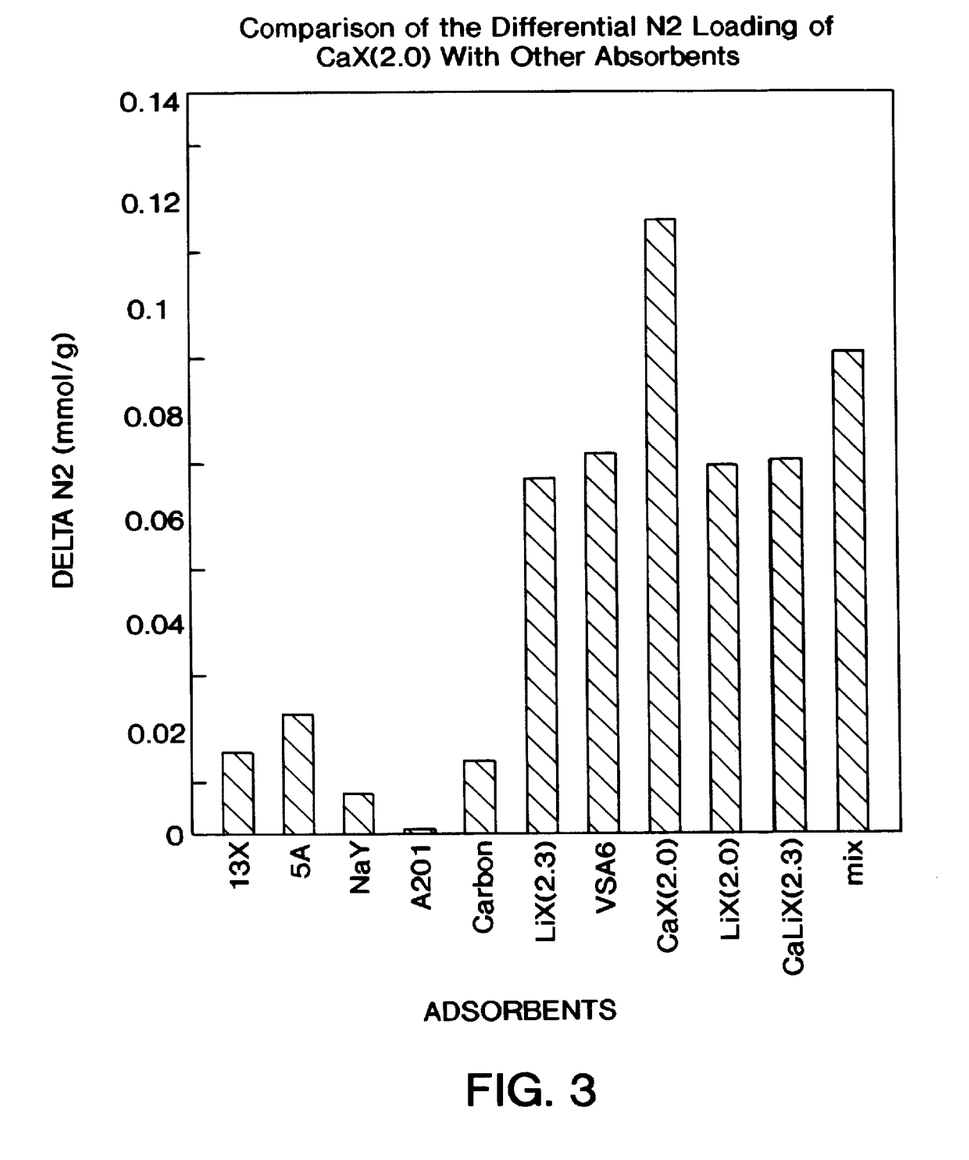
FIG. 3 is a comparison of the differential $N_2$ loading of CaX (2.0) with other adsorbents.

The superiority of CaX (2.0) as an adsorbent for nitrogen is illustrated in FIGS. 2 and 3. FIG. 2 compares the nitrogen adsorption isotherms at 300° K. of CaX (2.0) with other zeolites; whereas, FIG. 3 compares the $N_2$ differential loadings on several adsorbents. The $N_2$ differential loading for each adsorbent in FIG. 3 was determined as the difference in loading of $N_2$ on the adsorbent between the end of adsorption and desorption steps in the cycle. The pressure, temperature and $N_2$ composition at the end of adsorption and desorption steps used in the calculation are (11.7 bar, 306° K., $Y_{N2}$=0.008) and (1.36 bar, 306° K., $Y_{N2}$=0.025), respectively. Pure component isotherm data were used in conjunction with a multicomponent isotherm model to determine the loadings at the conditions indicated.

FIG. 2 shows that CaX (2.0) exhibits substantially greater $N_2$ adsorption than 5A and VSA6 across a broad range of adsorption partial pressures.

It is further evident from FIG. 3 that CaX (2.0), LiX (2.3), VSA6, LiX (2.0), CaLiX (2.3), and the CaX(2.0)/13X mix exhibit superior differential $N_2$ loading as compared with 13X, 5A, NaY, activated alumina (A201) and activated carbon.

Figure 4:
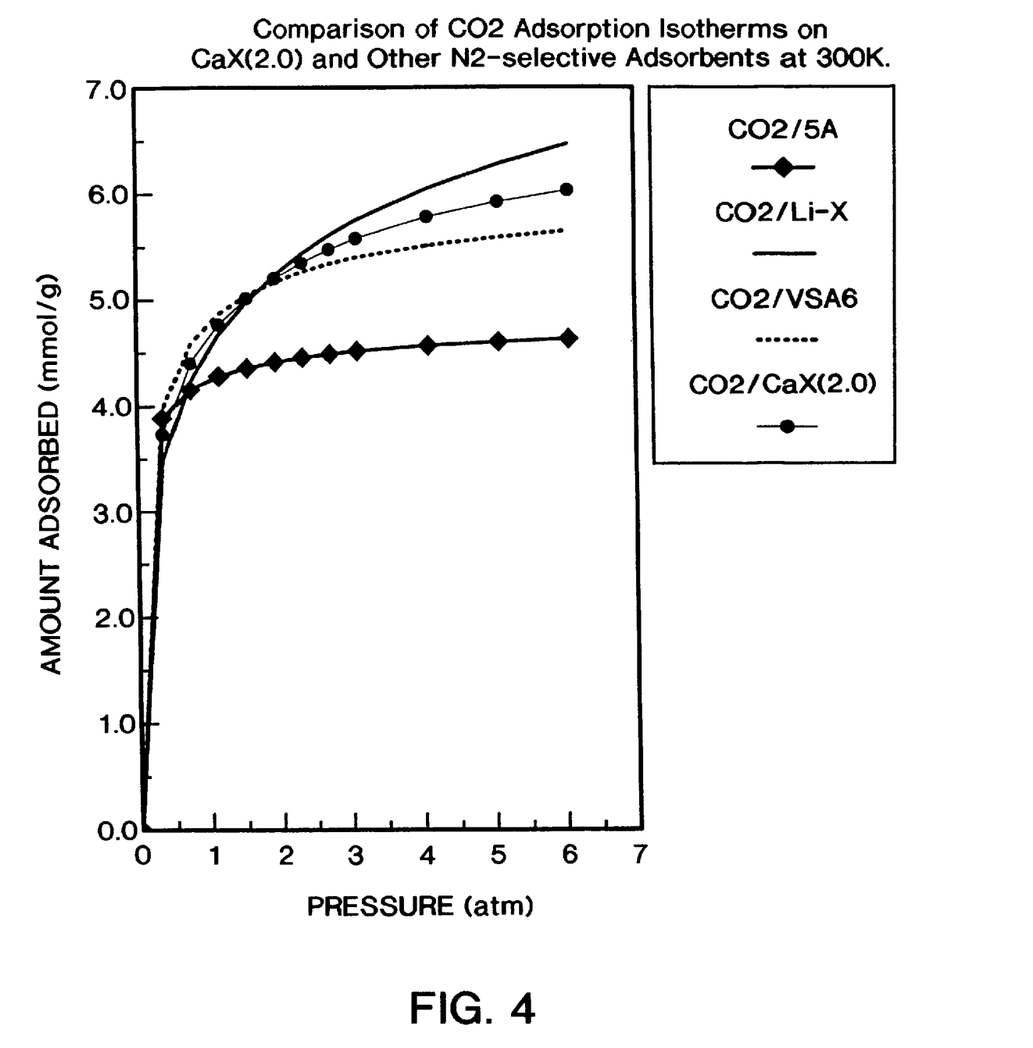
FIG. 4 is a comparison of the $CO_2$ adsorption isotherms of CaX (2.0) and other $N_2$-selective adsorbents, at 300° K.

FIG. 4 of the drawing illustrates the comparative amount of $CO_2$ adsorbed by various zeolites at, 300°' K. $CO_2$ is strongly adsorbed on CaX (2.0) at $CO_2$ partial pressures in excess of about 2 atmospheres—CaX solely exceeded by LiX in this regard. When a substantial amount of $CO_2$ is adsorbed on these $N_2$-selective zeolites regeneration by pressure swing adsorption is extremely difficult, i.e. at the typical operating conditions of $H_2$ PSA processes. When $CO_2$ is coadsorbed with $N_2$, adsorption capacity for $N_2$ and other trace impurities is diminished, resulting in degradation of PSA process performance and hydrogen purity. Accordingly as indicated above, it is desirable to adsorb other impurities, e.g. $CO_2$, $H_2O$, $CH_4$ and CO, from the feed gas stream prior to their passing through the CaX, LiA or LiX zeolite layer. In particular, it is important to reduce the $CO_2$ content of the gas stream before such stream reaches the zeolite to less than about 0.15 mole %, preferably to less than about 0.05 to 0.10 mole %, thereof.

Figure 5:
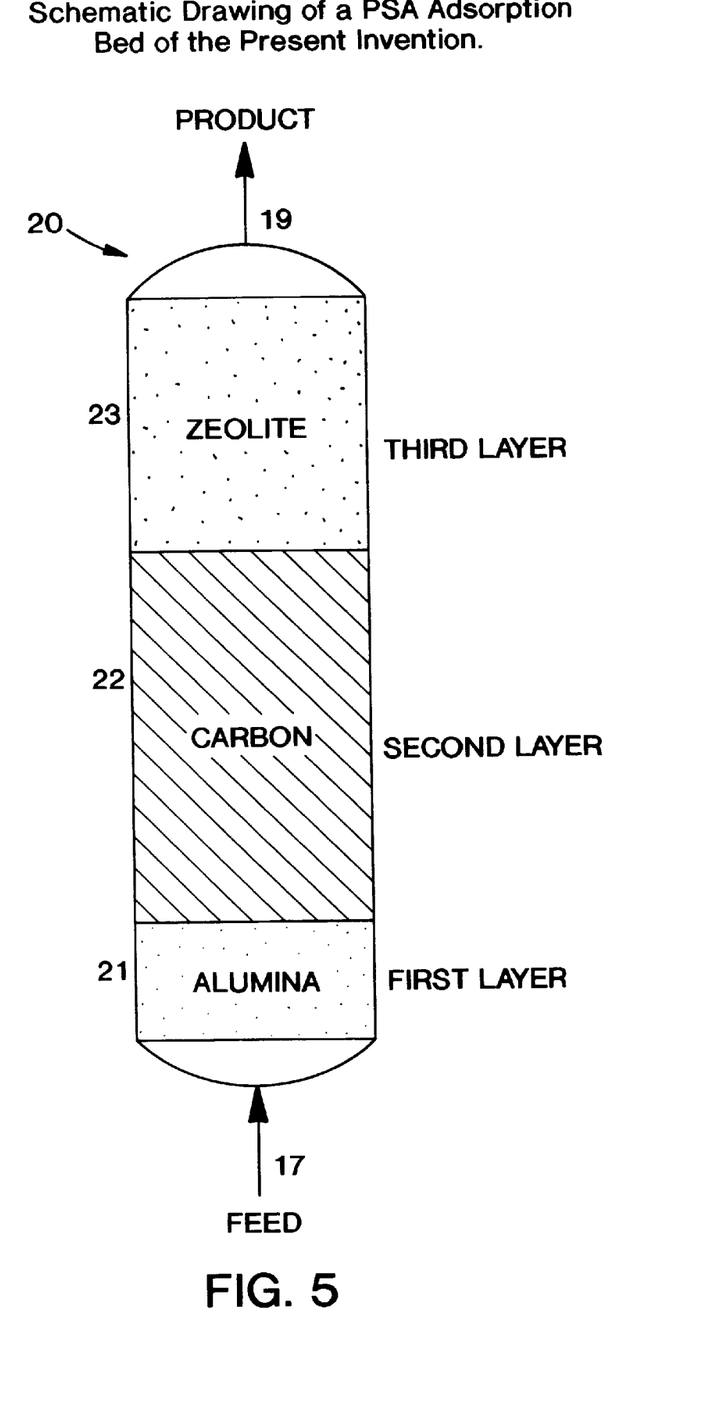
FIG. 5 is a schematic drawing of a PSA adsorption bed of the present invention.

It is preferred to utilize one or more adsorbent beds incorporating multiple layers for removal of the foregoing impurities in the practice of the present invention. One preferred layered configuration is illustrated in FIG. 5 showing adsorbent bed embodiment 20. Bed 20 includes a first alumina layer 21 for removing $H_2O$ from the feed gas stream, i.e. the synthesis gas stream 17 of the reforming technique illustrated in FIG. 1. Layer 21 is followed by an activated carbon layer 22 for removing $CO_2$ from the feed gas stream to concentrations less than about 0.15 mole %. Finally, a CaX, LiA or LiX adsorbent layer 23 is located at the product end of the bed for removing $N_2$, thereby producing the desired high purity $H_2$ product stream 19. One skilled in the art will recognize that other adsorbents may be substituted for alumina for $H_2O$ adsorption in layer 21, e.g. zeolites, silica gel, and that other $CO_2$-selective adsorbents may be substituted for activated carbon in layer 22 of bed 20.

The $H_2$ PSA process of the invention is suitably carried out at conditions previously utilized in the art, e.g. as described in U.S. Pat. No. 3,564,816, the process parameters of which are incorporated by reference herein. Thus, N2 adsorption in the CaX, LiA or LiX adsorbent layer may be carried out at temperatures from about 250 to 350° K., and at total pressures from about 5 to 20 bars. The adsorbent layer may thereafter be depressurized and purged at temperatures of from about 250 to 350° K. and at total pressures from about 0.50 to 1.70 bars. Specific temperature, pressure and other operating conditions utilized in the $H_2$ PSA system incorporating the CaX, LiA or LiX adsorbent in accordance with the present invention will depend upon the design of the particular PSA system. The choice of operating conditions will also depend upon the adsorbents selected for the other layers in the bed, the feed gas composition and flow rate and other parameters associated with the integration of the PSA unit with the other unit operations shown in FIG. 1.

EXAMPLES

Figure 7:
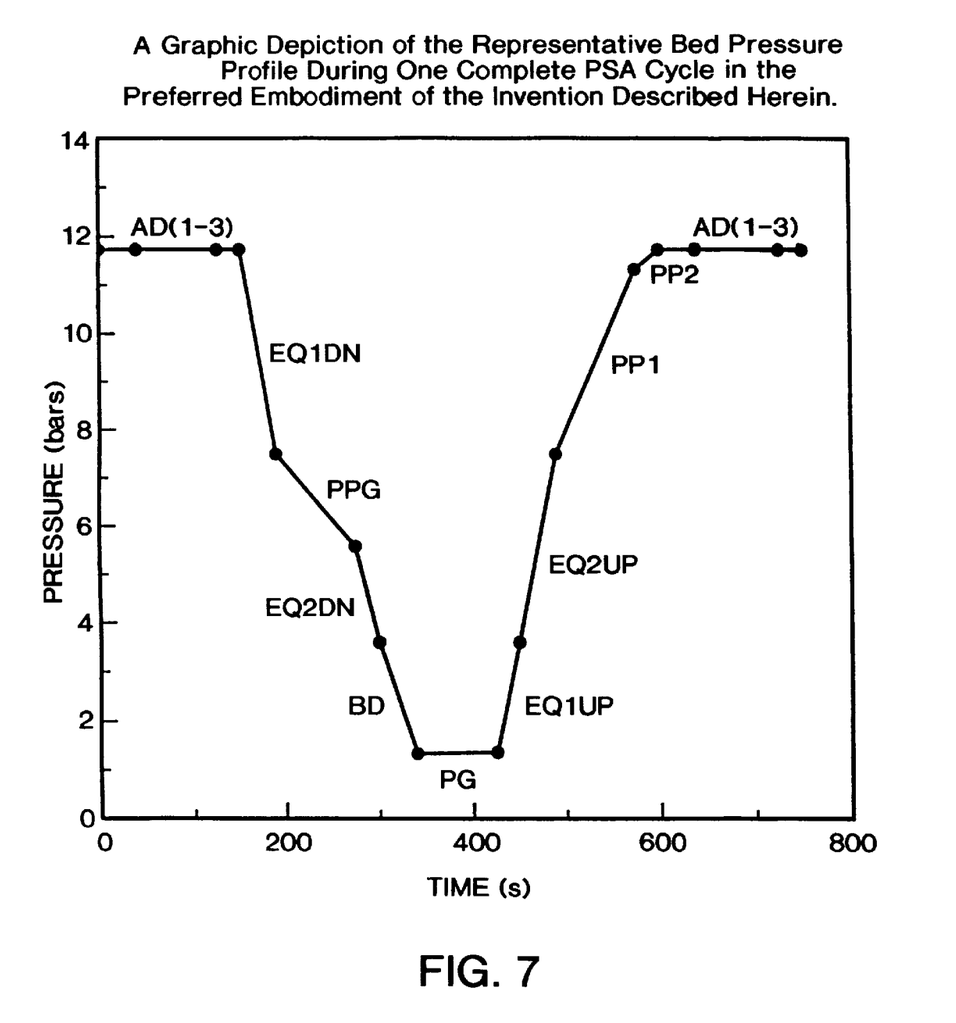
FIG. 7 is a graphic depiction of the representative bed pressure profile during one complete PSA cycle in the preferred embodiment of the invention described herein.
Figure 8:
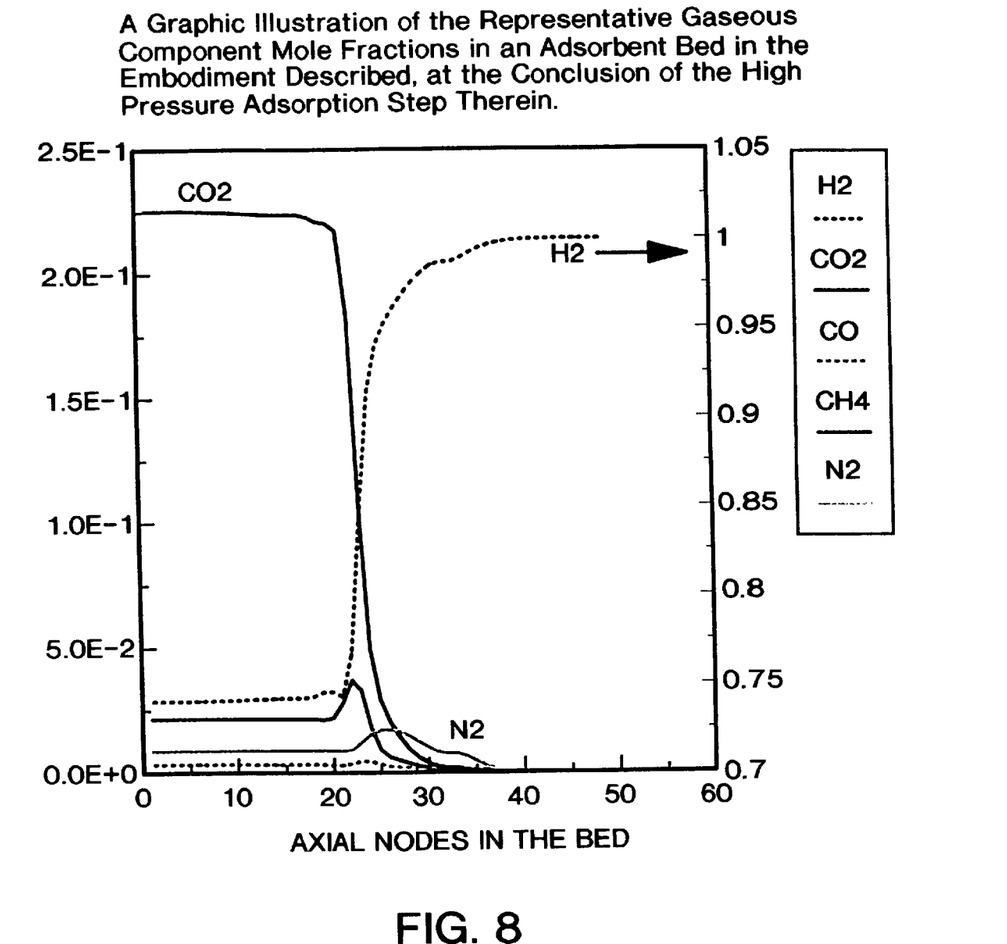
FIG. 8 is a graphic illustration of the representative gaseous component mole fractions in an adsorbent bed in the embodiment described, at the conclusion of the high pressure adsorption step therein.

The present invention will be more fully described in connection with the following computer-simulated embodiments employing the four-bed system illustrated in FIG. 6 of the drawings, each bed of which utilizes alumina, activated carbon and an $N_2$-selective adsorbent arranged in layers as shown below. The bed pressure and axial gas phase concentration profiles are shown in FIGS. 7 and 8, respectively. The valve switching logic, the time interval, and step sequence of the PSA cycle are shown in Table 1 below.

The sequence for the twelve step illustrative cycle is as follows:

Step 1 (AD1): Bed 1 (B1) is in the first adsorption step (AD1) at 11.72 bars, while bed 2 (B2) is undergoing countercurrent blowdown (BD), bed 3 (B3) is undergoing the first equalization falling step (EQ1DN), and bed 4 (B4) is undergoing the second pressure equalization rising step (EQ2UP).

Step 2 (AD2): Bed 1 is in the second adsorption step (AD2) and is also supplying product gas to bed 4 that is undergoing the first product pressurization (PP1) step. During the same time, beds 2, 3 and 4 are undergoing purge, concurrent depressurization and first product pressurization, respectively.

Step 3 (AD3): Bed 1 is in the third adsorption step (AD3), and is also supplying product gas to bed 4 that is undergoing the second product pressurization (PP2) step. During the same time period, beds 2, 3 and 4 are undergoing the first equalization rising step (EQ1UP), second equalization falling step (EQ2DN), and second product pressurization step (PP2), respectively.

Step 4 (EQ1DN): Bed 1 is undergoing the first equalization falling step (EQ1DN), while bed 2 receives the gas from bed 1 and is undergoing the second equalization rising step (EQ2UP). Beds 3 and 4 are now undergoing blowdown (BD) and the first adsorption step (AD1), respectively.

Step 5 (PPG): Bed I is undergoing a cocurrent depressurization step to provide purge gas (PPG) to bed 3, while beds 2 and 4 are undergoing the first product pressurization (PP1) and the second adsorption step (AD2), respectively.

Step 6 (EQ2DN): Bed 1 undergoes a second equalization falling step (EQ2DN) by sending low pressure equalization gas to bed 3 that is undergoing the first equalization rising step (EQ1UP). Beds 2 and 4 are undergoing the second product pressurization (PP2) and third adsorption step, respectively.

Step 7 (BD): Beds 1 and 2 undergo the countercurrent blowdown (BD) and first adsorption (AD1) step, respectively. During this time beds 3 and 4 are undergoing bed-to-bed equalization, i.e., beds, 3 and 4 are undergoing the second equalization rising (EQ2UP) and first equalization falling (EQ1DN) steps, respectively.

Step 8 (PG): Bed 1 is now receiving purge gas (PG) from bed 4, and beds 2 and 3 are undergoing the second adsorption step and first product pressurization step (PP1), respectively.

Step 9 (EQ1UP): Bed 1 is undergoing the first equalization rising step (EQ1UP) by receiving low pressure equalization gas from bed 4 that is undergoing the second equalization falling step (EQ2DN). During the same time, beds 2 and 3 are undergoing the third adsorption step (AD3) and the second product pressurization step (PP2), respectively.

Step 10 (EQ2UP): Bed 1 is undergoing the second equalization rising step (EQ2UP) by receiving high pressure equalization gas from bed 2 that is undergoing the first equalization falling step (EQ1DN). During the same time, beds 3 and 4 are undergoing the first adsorption step (AD1) and countercurrent blowdown step (BD), respectively.

Step 11 (PP1): Bed 1 is receiving the first product pressurization (PP1) gas from bed 3 that is also in the second adsorption step (AD2), while bed 2 is undergoing the cocurrent depressurization step to provide purge gas (PPG) to bed 4.

Step 12 (PP2): Bed 1 is receiving second product pressurization (PP2) gas from bed 3 that is also in the third adsorption step (AD3). During the same time, bed 2 undergoes a second equalization falling step (EQ2DN) by sending low pressure equalization gas to bed 4 that is undergoing the first equalization rising (EQ1UP) step.

A summary of the aforementioned twelve-step PSA process is given in Table I below. In particular, Table I summarizes the valve sequence over one complete cycle for the four-bed PSA system shown in FIG. 6. It is noted that PV-1, PV-2 and PV-3 identify process control valves which rergulate the flow of gases in the system.

Note from Table 1 that the four beds PSA process operates in parallel, and during ¼ of the total cycle time one of the beds is in the adsorption step, while the other beds are either undergoing pressure equalization, purge, blowdown, or product pressurization.

TABLE 1

Four-Bed $H_2$ PSA Valve Switching
(0 = OPENED, C = CLOSED)

| Step | 1 | 2 | 3 | 4 | 5 | 6 | 7 | 8 | 9 | 10 | 11 | 12 |
|---|---|---|---|---|---|---|---|---|---|---|---|---|
| Time (Sec) | 40 | 85 | 25 | 40 | 85 | 25 | 40 | 85 | 25 | 40 | 85 | 25 |
| Bed 1 (BD1I) | AD1 | AD2 | AD3 | EQ1 DN | PPG | EQ2 | BD | PG | EQ1 UP | EQ2 UP | PP1 | PP2 |
| Bed 2 (BD2) | BD | PG | EQ1 UP | EQ2 UP | PPI | PP2 | AD1 | AD2 | AD3 | EQ1 DN | PPG | EQ2 DN |
| Bed 3 (PP2) | EQ1 DN | PPG | EQ2 DN | BD | PG | EQ1 UP | EQ2 UP | PP1 | FP2 | AD1 | AD2 | AD3 |
| Bed 4 | EQ2 UP | PP1 | PP2 | AD1 | AD2 | AD3 | EQ1 DN | PPG | DN | BD | PG | EQ1 UP |
| Valve No. | | | | | | | | | | | | |
| 31 | 0 | 0 | 0 | C | C | C | C | C | C | C | C | C |
| 32 | C | C | C | C | C | C | 0 | 0 | 0 | C | C | C |
| 33 | C | C | C | C | C | C | C | C | C | 0 | 0 | 0 |
| 34 | C | C | C | 0 | 0 | 0 | C | C | C | C | C | C |
| 35 | 0 | 0 | C | 0 | 0 | C | 0 | 0 | C | 0 | 0 | C |
| 36 | C | C | C | C | C | C | 0 | 0 | C | C | C | C |
| 37 | 0 | 0 | C | C | C | C | C | C | C | C | C | C |
| 38 | C | C | C | 0 | 0 | C | C | C | C | C | 0 | C |
| 39 | C | C | C | C | C | C | C | C | C | 0 | 0 | C |
| 40 | C | 0 | 0 | C | 0 | 0 | C | 0 | 0 | C | 0 | 0 |
| 41 | 0 | 0 | 0 | C | C | C | C | C | C | C | C | C |
| 42 | C | C | C | C | C | C | 0 | 0 | 0 | C | C | C |
| 43 | C | C | C | C | C | C | C | C | C | 0 | 0 | C |
| 44 | C | C | C | 0 | 0 | 0 | C | C | C | C | C | C |
| 45 | C | C | C | C | 0 | 0 | C | 0 | 0 | C | C | C |
| 46 | C | 0 | 0 | C | C | C | C | C | C | C | 0 | 0 |
| 47 | C | 0 | 0 | C | 0 | 0 | C | C | C | C | C | C |
| 48 | C | C | C | C | C | C | C | 0 | 0 | C | 0 | 0 |

TABLE 1-continued

Four-Bed $H_2$ PSA Valve Switching
(0 = OPENED, C = CLOSED)

| Step | 1 | 2 | 3 | 4 | 5 | 6 | 7 | 8 | 9 | 10 | 11 | 12 |
|------|---|---|---|---|---|---|---|---|---|----|----|----|
| 49 | C | C | C | 0 | C | C | C | C | C | 0 | 0 | 0 |
| 50 | C | C | C | 0 | 0 | 0 | C | C | C | 0 | C | C |
| 51 | 0 | C | C | C | C | C | 0 | 0 | 0 | C | C | C |
| 52 | 0 | 0 | 0 | C | C | C | 0 | C | C | C | C | C |

Figure 6:
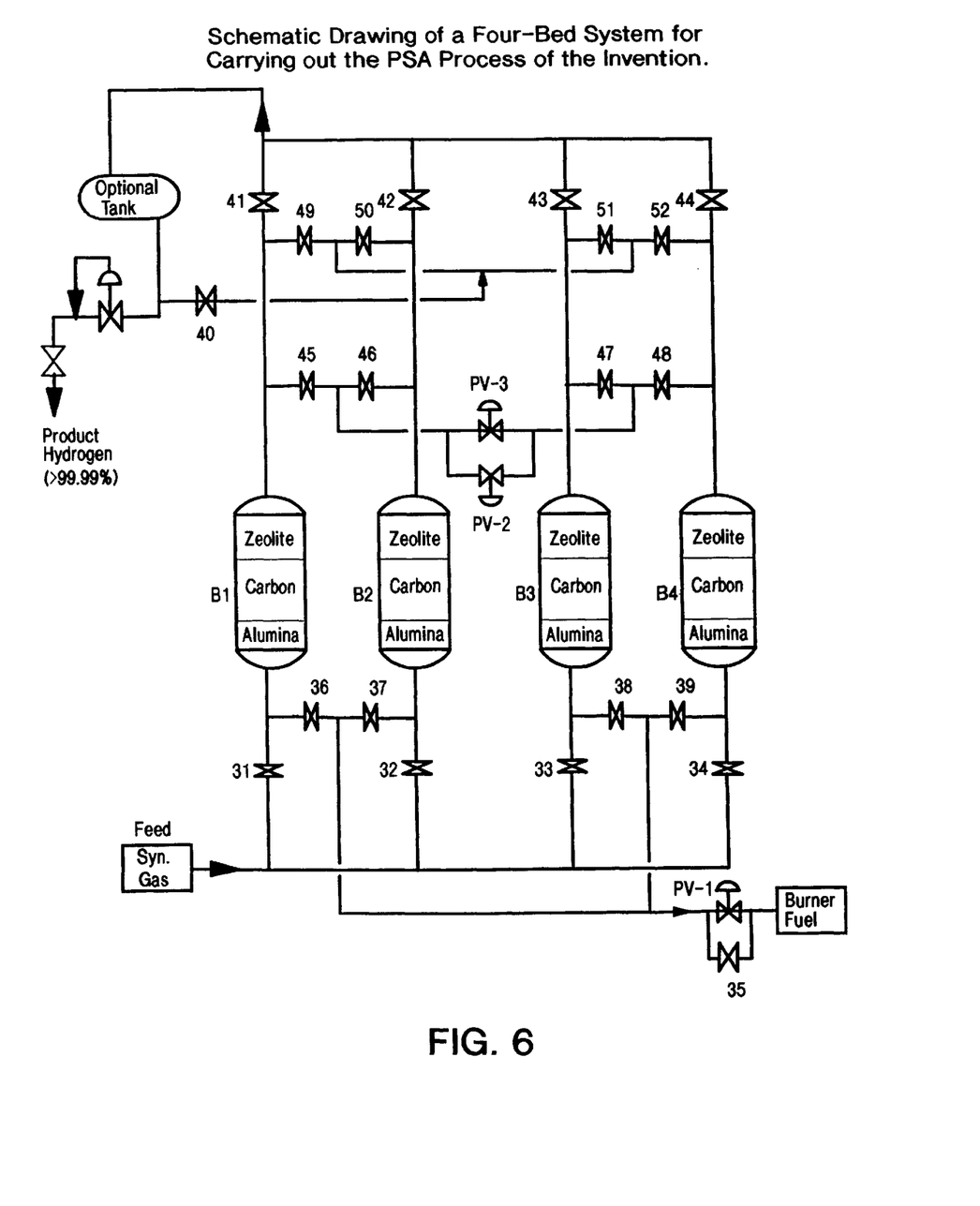
FIG. 6 is a schematic drawing of a four-bed system for carrying out the PSA process of the invention.

It should be noted that the twelve-step PSA cycle is illustrative only, and is given to demonstrate the enhanced PSA process performance achieved by replacing 5A with the CaX adsorbent in the upper layer of the adsorbent beds shown in FIG. 6. Other PSA cycles may also be used to show the enhanced PSA process performance obtained in accordance with the invention without deviating from its scope.

A detailed adsorption model, based upon the governing material and energy balances involved in the process, has been applied to simulate the PSA process described above. A plug flow with negligible axial dispersion was used in all of the PSA simulations. Additional characteristics of the model include: bed pressure drop, multicomponent isotherm (as determined by the loading ratio correlation), adiabatic energy balance and adsorption rate (as determined by the linear driving force). The simulation results were found to agree well with pilot scale experimental process performance results.

The results shown in Examples 1–4 below were obtained from PSA simulation results using the following feed mixture on a dry basis: 74.03% $H_2$, 22.54% $CO_2$, 0.36% CO, 2.16% $CH_4$ and 0.91% $N_2$. Also, total bed size factor is the total quantity of adsorbents per ton per day of $H_2$ produced.

Example 1
Use of CaX (2.0) Adsorbent

Table 2 below discloses the operating conditions and PSA performance for a process utilizing CaX (2.0) adsorbent in the top layer of each of the adsorbent beds B1 to B4 in the system illustrated in FIG. 6 of the drawings. The process is performed in the manner set forth in Table 1 and shown in FIGS. 7 and 8 of the drawings. In Tables 2–5, the symbols have the following meaning: TPD=ton per day of hydrogen, s=time unit in seconds, ton 2000 lb.

TABLE 2

Example 1

| | |
|---|---|
| Cycle time(s) | 600 |
| Adsorbent in first layer of Bed | Alumina |
| Amount of alumina (lb/TPD $H_2$) | $1.0385 \times 10^3$ |
| Adsorbent in second layer of bed: | activated carbon |
| Amount of activated carbon (lb/TPD $H_2$ | $4.9170 \times 10^3$ |
| Adsorbent in third layer of bed: | CaX (2.0) zeolite |
| Amount of CaX (2.0) zeolite (lb/TPD $H_2$) | $1.5102 \times 10^3$ |
| High Pressure: kPa | $1.171 \times 10^3$ |
| Low Pressure: kPa | $1.327 \times 10^2$ |
| Feed Flux:² kmol/s m² | $1.392 \times 10^{-2}$ |
| Hydrogen Purity: | 99.993% |
| Hydrogen Recovery: | 81.6% |
| Total Bed Size Factor (lb/TPD $H_2$): | $7.4657 \times 10^3$ |
| Temperature: K | 311 |

Example 2
Use of LiX Adsorbent

Table 3 below discloses the operating conditions and PSA performance for a process utilizing a LiX zeolite adsorbent in the top layer of each of the adsorbent beds B1 to B4, carrying out the process in the same manner as in Example 1.

TABLE 3

Example 2, LiX Zeolite

| | |
|---|---|
| Cycle time(s) | 600 |
| Adsorbent in first layer of Bed | Alumina |
| Amount of alumina (lb/TPD $H_2$): | $1.0645 \times 10^3$ |
| Adsorbent in second layer of bed: | activated carbon |
| Amount of activated carbon (lb/TPD $H_2$): | $5.0400 \times 10^3$ |
| Adsorbent in third layer of bed: | LiX zeolite |
| Amount of LiX zeolite (lb/TPD $H_2$): | $2.5801 \times 10^3$ |
| High Pressure: kPa | $1.171 \times 10^3$ |
| Low Pressure: kPa | $1.327 \times 10^2$ |
| Feed Flux: kmol/s m² | $1.392 \times 10^{-2}$ |
| Hydrogen Purity: | 99.993% |
| Hydrogen Recovery: | 79. 61% |
| Total Bed Size Factor (lb/TPD $H_2$): | $8.6845 \times 10^3$ |
| Temperature: K | 311 |

Example 3
Use of VSA6 Adsorbent

Table 4 below discloses the operating conditions and PSA performance for a process utilizing a VSA6 zeolite adsorbent in the top layer of each of the adsorbent beds B1 to B4, and again carrying out the process in the same manner as in Example 1.

TABLE 4

Example 3, VSA6 Zeolite

| | |
|---|---|
| Cycle time(s) | 600 |
| Adsorbent in first layer of Bed | Alumina |
| Amount of alumina (lb/TPD $H_2$): | $1.0568 \times 10^3$ |
| Adsorbent in second layer of bed: | activated carbon |
| Amount of activated carbon (lb/TPD $H_2$): | $5.0035 \times 10^3$ |
| Adsorbent in third layer of bed: | VSA6 zeolite |
| Amount of VSA6 zeolite (lb/TPD $H_2$): | $2.3906 \times 10^3$ |
| High Pressure: kPa | $1.171 \times 10^3$ |
| Low Pressure: kPa | $1.327 \times 10^2$ |
| Feed Flux: kmol/s m² | $1.392 \times 10^{-2}$ |
| Hydrogen Purity: | 99.984% |
| Hydrogen Recovery: | 80.19% |
| Total Bed Size Factor (lb/TPD $H_2$): | $8.4509 \times 10^3$ |
| Temperature: K | 311 |

Example 4
Control—Comparative Process Utilizing 5A Zeolite

Table 5 below discloses the operating conditions and PSA performance for a process utilizing a 5A zeolite adsorbent in the top layer of each of the adsorbent beds B1 to B4, carrying out the process in the same manner as in Example 1:

TABLE 5

Control 5A Zeolite

| | |
|---|---|
| Cycle time(s) | 640 |
| Adsorbent in first layer of Bed | Alumina |
| Amount of alumina (lb/TPD $H_2$): | $1.2108 \times 10^3$ |
| Adsorbent in second layer of bed: | activated carbon |
| Amount of activated carbon (lb/TPD $H_2$): | $5.7326 \times 10^3$ |
| Adsorbent in third layer of bed: | 5A zeolite |
| Amount of 5A zeolite (lb/TPD $H_2$): | $7.0511 \times 10^3$ |
| High Pressure: kPa | $1.171 \times 10^3$ |
| Low Pressure: kPa | $1.327 \times 10^2$ |
| Feed Flux: kmol/S.m$^2$ | $1.392 \times 10^{-2}$ |
| Hydrogen Purity: | 99.991% |
| Hydrogen Recovery: | 70.0% |
| Total Bed Size Factor (lb/TPD $H_2$): | $1.3995 \times 10^4$ |
| Temperature: K | 311 |

As shown in Table 6 below and in FIGS. 9 and 10, use of the CaX (2.0) zeolite adsorbent provides substantially superior results as compared with use of the LiX, VSA6 and 5A zeolites. On the other hand, the use of LiX and VSA6 zeolites results in substantially less adsorbent to provide substantially greater $H_2$ recoveries and substantially 15 smaller Bed Size Factors than 5A zeolite.

TABLE 6

Comparative Performance of CaX (2.0) Zeolite and Other $N_2$ Selective Zeolite Adsorbents

| | Example 1 | Example 2 | Example 3 | Control |
|---|---|---|---|---|
| N2 Adsorbent | CaX (2.0) | LiX | VSA6 | 5A |
| Amount of N2 Adsorbent (lb./TPD $H_2$) | $1.5102 \times 10^3$ | $2.5801 \times 10^3$ | $2.3906 \times 10^3$ | $7.0511 \times 10^3$ |
| H2 Purity | 99.993% | 99.993% | 99.984% | 99.991% |
| H2 Recovery | 81.6% | 79.61% | 80.19% | 70.0% |
| Total Bed Size Factor (lb/TPD $H_2$) | $7.4657 \times 10^3$ | $8.6845 \times 10^3$ | $8.4509 \times 10^3$ | $1.3995 \times 10^4$ |

Figure 9A:
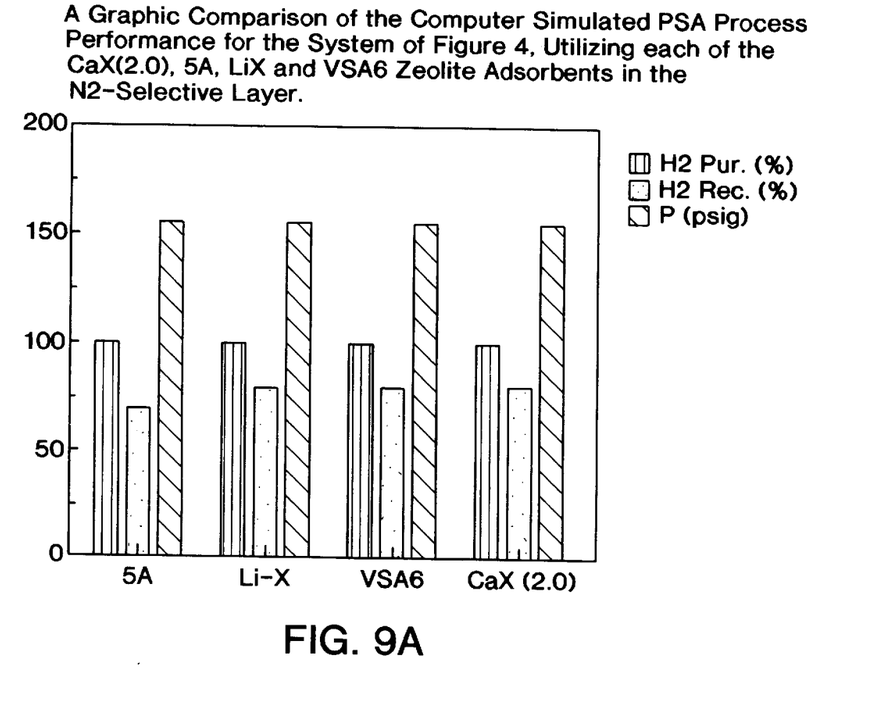
FIG. 9 is a graphic comparison of the computer simulated PSA process performance for the system of FIG. 5, utilizing each of the CaX (2.0), 5A, LiX and VSA6 zeolite adsorbents in the $N_2$-selective layer.
Figure 9B:
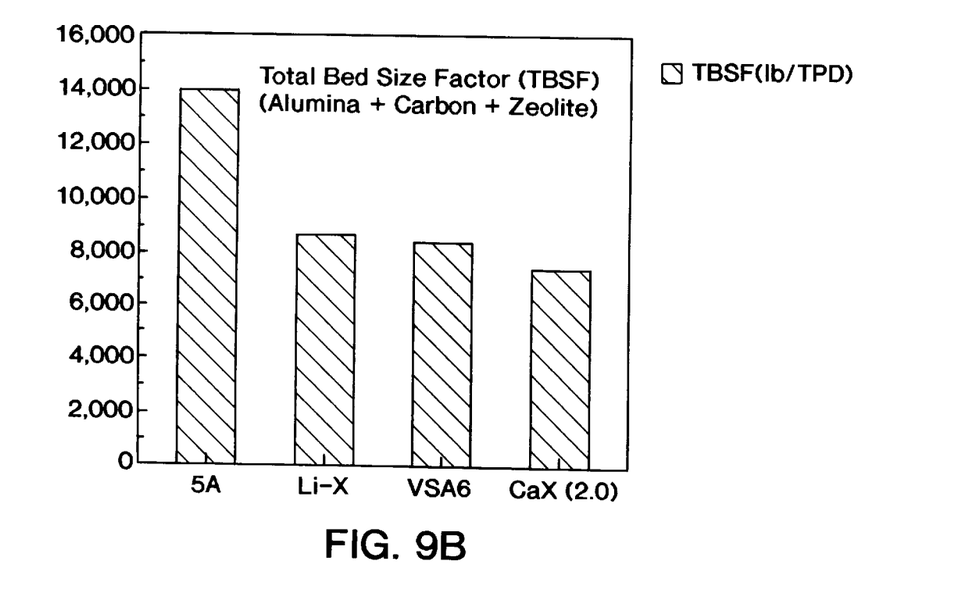

The results of Table 6 and FIG. 9 indicate H2 recoveries of about 70% for 5A zeolite and 80% for the other adsorbents, for about the same $H_2$ Purity (99.99%). CaX (2.0) allows more feed gas per unit weight of adsorbent at a given P/F ratio (purge to feed) than any of the other adsorbents compared above, i.e. CaX(2.0) has the lowest bed size factor (BSF).

Figure 10A:
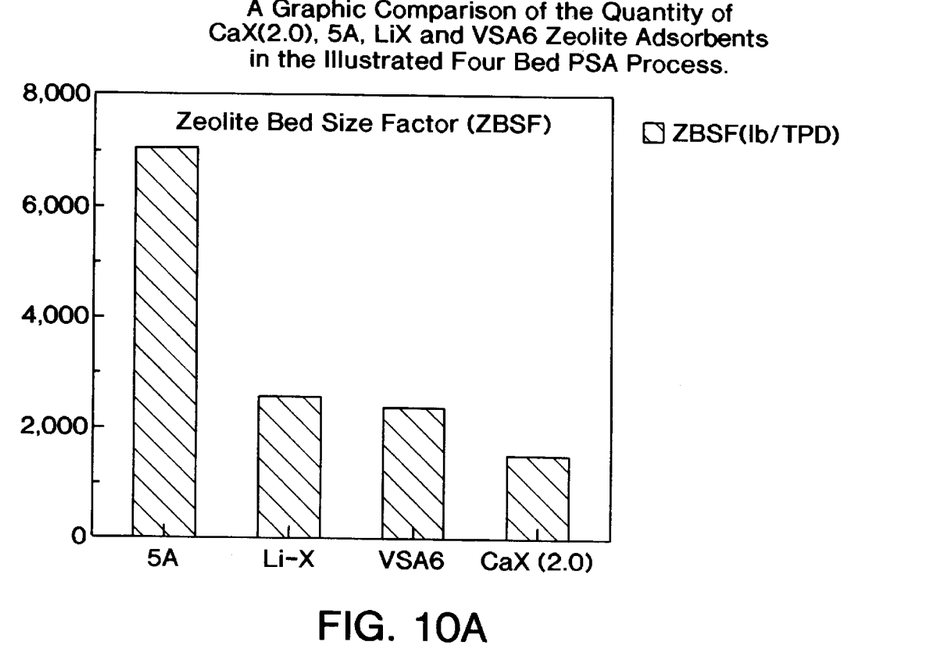
FIG. 10 is a graphic comparison of the quantity of CaX (2.0), 5A, LiX and VSA6 zeolite adsorbents required in the illustrated four bed PSA process.
Figure 10B:
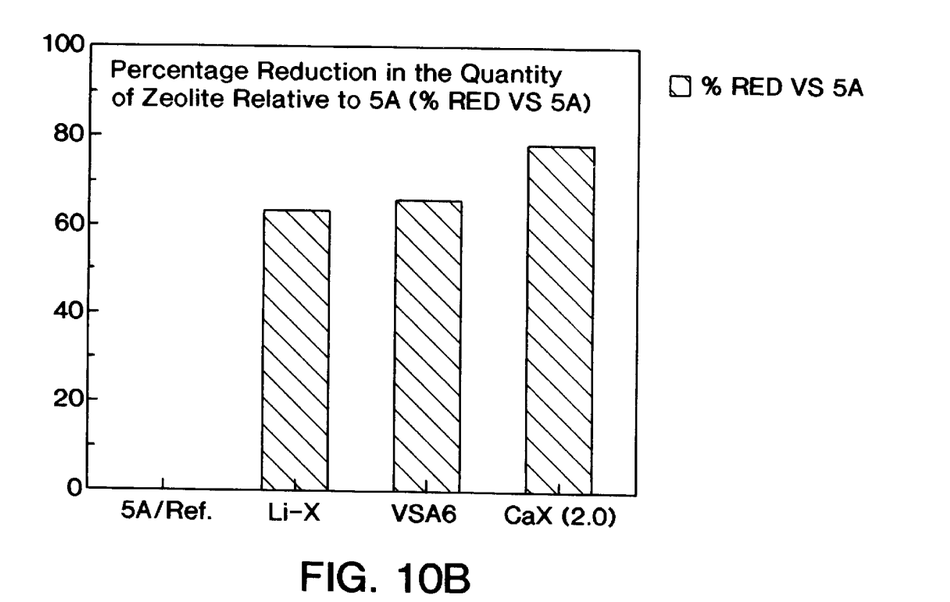

As shown in FIG. 10, 78% less zeolite is required as compared to 5A by using CaX (2.0) zeolite, while a 65% reduction is achieved if LiX or VSA6 is used instead of 5A zeolite to produce $H_2$ at the same purity (99.99%) and recovery (>78%). The smaller bed size factor resulting from the use of CaX reduces the overall void volume such that less hydrogen is lost during the regeneration of the bed, i.e. there is higher $H_2$ recovery. It is further observed from FIG. 8 that $N_2$ is primarily removed in the CaX zeolite layer (Nodes 32–49) of the bed, while the other impurities (e.g., $CO_2$, $CH_4$ and CO) are removed in the alumina (nodes 1–17) and activated carbon (nodes 17–32) layers upstream of the zeolite layer.

Figure 11:
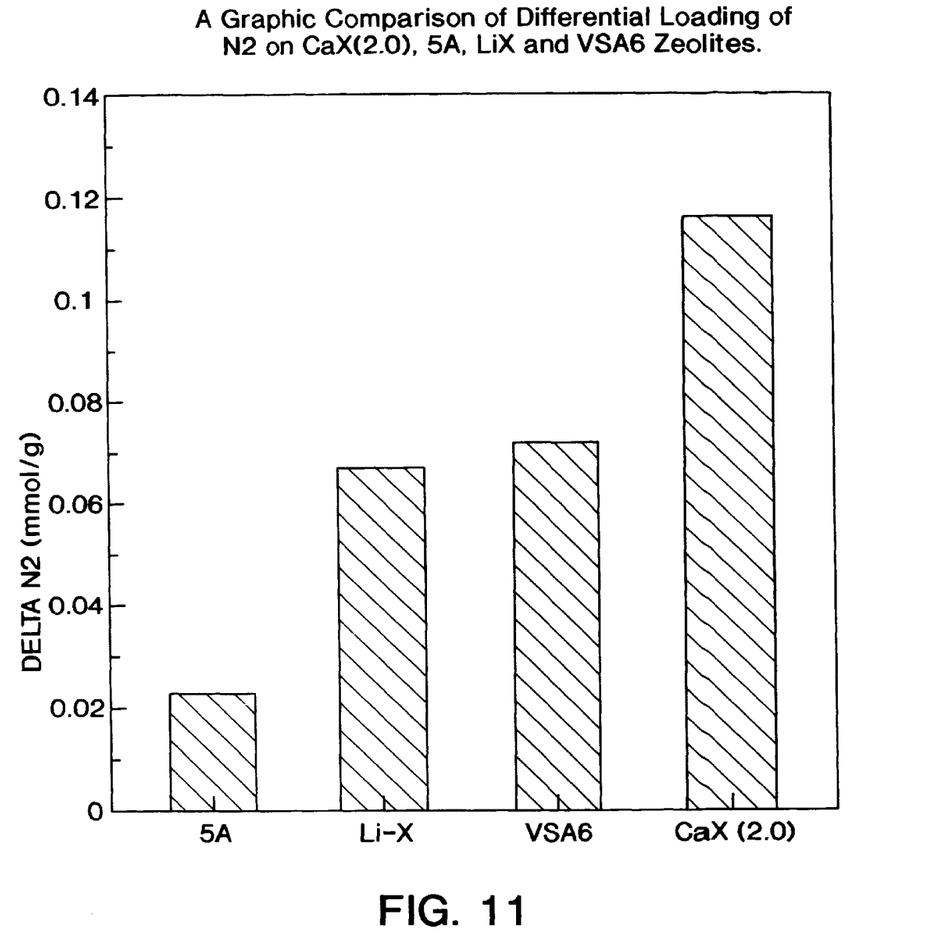
FIG. 11 is a graphic comparison of differential loading of $N_2$ on CaX (2.0), 5A, LiX and VSA6 zeolites.

The superior adsorption characteristics of CaX (2.0) zeolite is further illustrated in FIG. 11 of the drawings, which shows the differential loading or working capacity of $N_2$ on CaX (2.0) as compared with the 5A, LiX and VSA6 zeolites. The differential N2 loading on CaX (2.0) is more than 5 times, and the differential $N_2$ loading on LiX and VSA6 more than 3 times that on the 5A zeolite. The differential N2 loading on each adsorbent in FIG. 11 was calculated using the same conditions given above for FIG. 3. As shown in the comparative tests and the foregoing Figures, in accordance with the present invention, CaX (2.0) is the adsorbent of choice for the $H_2$ PSA process of the invention.

Although the foregoing PSA processes relate to $H_2$ production, the key features of this invention may be extended to other separation processes, e.g. $CO_2$ production from synthesis gas or other sources containing $CO_2$ in the feed, or in other PSA processes for the co-production of $H_2$ and CO. For example, CaX (2.0) could replace 5A or LiX zeolite in other separation processes that require the removal of trace or low concentration levels of $N_2$ to achieve enhanced PSA process performance and high purity product.

In addition, the zeolite layer/zone of each adsorbent bed may be replaced with multiple layers of different adsorbents. For example, the homogeneous zeolite layer may be substituted by a composite adsorbent layer containing different adsorbent materials positioned in separate zones and employing temperature conditions favoring adsorption performance of the particular adsorbent materials under applicable processing conditions in each zone.

It will be understood that these and other changes may be made in the preferred parameters of the PSA process hereof without departing from the invention. Accordingly, it is intended that the scope of this invention should be determined from the claims appended hereto.

What is claimed is:

1. A pressure swing adsorption (PSA) process for purifying a feed stream containing at least one of $H_2O$, $N_2$, $CO_2$, $CH_4$ and CO, and more than 50 mole % hydrogen, which comprises passing the feed stream at a pressure above atmospheric pressure through a multilayer adsorbent bed, wherein at least one of said $H_2O$, $CO_2$, $CH_4$ and CO is adsorbed from the gas stream prior to passing the stream through a layer of a synthetic zeolite adsorbent having a $SiO_2/Al_2O_3$ ratio within the range of 2.0–2.5 and selected from the group consisting of CaX, LiX and VSA6 adsorbent to adsorb substantially all of the nitrogen in such stream and recovering purified (>99.9%) hydrogen as product from the multilayer adsorbent bed.

2. The pressure swing adsorption process of claim 1, wherein the feed stream contains less than 3% $N_2$.

3. The pressure swing adsorption process of claim 1, wherein the gas stream immediately prior to being passed through the zeolite adsorbent contains on an average less than 0.15 mole % $CO_2$.

4. The pressure swing adsorption process of claim 1, wherein the feed gas stream to be treated is a synthesis gas containing from 60 to 90 mole % hydrogen.

5. The pressure swing adsorption process of claim 1, wherein said CaX zeolite is ion exchanged with >90% Ca.

6. The pressure swing adsorption process of claim 5, wherein said $SiO_2/Al_2O_3$ molar ratio is 2.0.

7. The pressure swing adsorption process of claim 1, wherein the feed gas stream is first passed through an adsorbent bed containing an alumina layer for adsorption of $H_2O$, then through an activated carbon layer for adsorption of CO, $CH_4$ and $CO_2$ and then through said zeolite layer for adsorption of nitrogen.

8. The pressure swing adsorption process of claim 1, wherein the feed stream is at a pressure from 5 to 20 bars.

9. The pressure swing adsorption process of claim 1, wherein said $H_2O$, $CO_2$, $CH_4$ and CO are substantially adsorbed from the gas stream prior to the stream passing through the synthetic zeolite adsorbent.

10. The pressure swing adsorption process of claim 1, which comprises passing said stream at pressures of from 5 to 20 bars through four adsorbent beds each of which includes a layer of said naturally occurring or synthetic zeolite for adsorbing nitrogen from the gas stream, utilizing the 12-step PSA step sequence illustrated in Table 1 thereof.

11. The pressure swing adsorption process of claim 1, wherein the total bed size factor is less than 9,000 lb/TPD of hydrogen, and hydrogen recoveries of the order to 80% or greater are obtained.

12. The pressure swing adsorption process of claim 1, wherein the feed stream contains less than 1.5% $N_2$.

* * * * *